(12) United States Patent
Wang (10) Patent No.: US 9,155,119 B2
(45) Date of Patent: Oct. 6, 2015

(54) METHODS AND APPARATUSES FOR ESTABLISHING RRC CONNECTION THROUGH DRIFT RNC

(71) Applicant: Alcatel-Lucent Canada Inc., Ottawa (CA)

(72) Inventor: Junfeng Wang, Nepean (CA)

(73) Assignee: Alcatel Lucent, Boulogne-Billancourt (FR)

( * ) Notice: Subject to any disclaimer, the term of this patent is extended or adjusted under 35 U.S.C. 154(b) by 72 days.

(21) Appl. No.: 13/959,194

(22) Filed: Aug. 5, 2013

(65) Prior Publication Data

US 2015/0038155 A1     Feb. 5, 2015

(51) Int. Cl.
*H04W 72/00*     (2009.01)
*H04W 76/02*     (2009.01)
*H04W 92/22*     (2009.01)

(52) U.S. Cl.
CPC ............ *H04W 76/027* (2013.01); *H04W 92/22* (2013.01)

(58) Field of Classification Search
CPC ........... H04W 8/02; H04W 8/06; H04W 8/08; H04W 8/12; H04W 8/22; H04W 36/00
USPC .................................. 455/452.1, 432.1, 436
See application file for complete search history.

(56) References Cited

U.S. PATENT DOCUMENTS

| | | | |
|---|---|---|---|
| 8,045,987 B2 | 10/2011 | Rudolf et al. | |
| 2005/0037767 A1* | 2/2005 | Kim et al. | 455/450 |
| 2009/0052376 A1 | 2/2009 | Cave et al. | |
| 2014/0161076 A1* | 6/2014 | Cave et al. | 370/329 |

FOREIGN PATENT DOCUMENTS

| | | |
|---|---|---|
| CN | 101426234 A | 5/2009 |
| EP | 1217855 A1 | 6/2002 |

OTHER PUBLICATIONS

International Search Report and Written Opinion issued in International Application No. PCT/CA2014/050726, mailed Oct. 23, 2014.
3GPP TS 25.414, Universal Mobile Telecommunications System (UMTS); UTRAN Iu interface data transport and transport signalling. 20 pages, V11.0.0 (Oct. 2010), Valbonne—France, http://www.3gpp.org/ftp/Specs/html-info/25414.htm.
3GPP TS 25.423, Universal Mobile Telecommunications System (UMTS); UTRAN Iur interface Radio Network Subsystem Application Part (RNSAP) signalling. 1165 pages, V11.5.0 (Apr. 2013), Valbonne—France, http://www.3gpp.org/ftp/Specs/html-info/25423.htm.

(Continued)

*Primary Examiner* — Temica M Beamer
(74) *Attorney, Agent, or Firm* — Harness, Dickey & Pierce, P.L.C.

(57) ABSTRACT

In a method for establishing a radio resource control connection between a user equipment and a serving radio network controller through a drift radio network controller, the drift network controller receives an indication of a forward access channel capability of the user equipment from the serving radio network controller, and transmits a signaling message to the user equipment according to the forward access channel capability of the user equipment to establish the radio resource control connection.

4 Claims, 4 Drawing Sheets

(56) References Cited

OTHER PUBLICATIONS

3GPP TS 25.426, Universal Mobile Telecommunications System (UMTS); UTRAN Iur and Iub interface data transport & transport signalling for DCH data streams. 14 pages, V11.0.0 (Oct. 2012), Valbonne—France, http://www.3gpp.org/ftp/Specs/html-info/25426.htm.

3GPP TR 25.931, Universal Mobile Telecommunications Systems (UMTS); UTRAN functions, examples on signalling procedures. 131 pages, V11.0.0 (Oct. 2012), Valbonne—France, http://www.3gpp.org/ftp/Specs/html-info/25931.htm.

* cited by examiner

| IE/Group Name | Presence | Range | IE Type and Reference | Semantics Description | Criticality | Assigned Criticality |
|---|---|---|---|---|---|---|
| Message Type | M | | 9.2.1.40 | | YES | ignore |
| Transaction ID | M | | 9.2.1.59 | | ... | |
| C-ID | M | | 9.2.1.6 | May be a GERAN cell identifier. | YES | ignore |
| D-RNTI | M | | 9.2.1.24 | | YES | ignore |
| L3 Information | M | | 9.2.1.32 | | YES | ignore |
| D-RNTI Release Indication | M | | 9.2.1.25 | | YES | ignore |
| URA-ID | O | | 9.2.1.70 | | YES | ignore |
| MBMS Bearer Service List | | 0..<maxNrOfMBMSservices> | | | GLOBAL | ignore |
| >TMGI | M | | 9.2.1.80 | | ... | |
| Old URA-ID | O | | URA-ID 9.2.1.70 | | YES | ignore |
| SRNC-ID | C-URA | | RNC-ID 9.2.1.50 | If the Extended SRNC-ID IE is included in the message, the SRNC-ID IE shall be ignored. | YES | ignore |
| Extended SRNC-ID | O | | Extended RNC-ID 9.2.1.50a | The Extended SRNC-ID IE shall be used if the RNC identity has a value larger than 4095. | YES | reject |
| Enhanced PCH Capability | O | | 9.2.1.132 | FDD and 1.28Mcps TDD only. | YES | ignore |
| HS-PDSCH in CELL_FACH | O | | Enumerated (TRUE) | The absence of this IE indicates that the UE does not support HS-PDSCH reception in CELL_FACH state. Note 1. | YES | ignore |

METHODS AND APPARATUSES FOR ESTABLISHING RRC CONNECTION THROUGH DRIFT RNC

BACKGROUND

A universal terrestrial radio access network (UTRAN) is a collective term for Node B's and radio network controllers (RNCs) of a universal mobile telecommunications system (UMTS) radio access network (RAN).

A RNC controls a given portion of the UTRAN. For example, the RNC manages UTRAN resources such as the downlink (DL) or forward link power transmitted by the Node Bs; the uplink (UL) or reverse link interference perceived by the Node Bs; and the hardware situated at the Node Bs.

With respect to a certain connection between the RAN and user equipment (RAN-UE connection), an RNC can either have the role of a serving RNC (SRNC) or a drift RNC (DRNC).

If an RNC is a serving RNC (SRNC), then the RNC is in charge of the connection with the user equipment unit (UE). In this case, the RNC has full control of the connection within the radio access network (RAN).

A DRNC supports the SRNC by supplying radio resources (within the cells controlled by the DRNC needed for a connection with the user UE.

When a radio failure condition between the UE and SRNC occurs and the UE camps on a new cell controlled by a new DRNC, a call may fail unless SRNC-triggered automatic recovery is invoked. To automatically recover and avoid call failure, the radio resource control (RRC) connection between the UE and the SRNC should be re-established through the new DRNC and its corresponding Node B.

Section 7.5.1.1 (Radio Resource Control (RRC) Connection Re-establishment) of the $3^{rd}$ Generation Partnership Project (3GPP) standards document 3GPP TR 25.931 describes the manner in which to perform automatic recovery from the above-described radio failure condition. Recovery requires transmission of a cell update confirm (CUC) RRC message from the drift RNC (DRNC) to the UE over a common control radio channel (CCCH).

If both the UE and the Node B controlled by the new DRNC support the Enhanced Forward Access Channel (eFACH), then the DRNC sends the CUC RRC message to the UE through the Node B via the eFACH CCCH. In this case, the message is transmitted via the High-Speed Data Signaling Control Channel (HS-DSCH).

If the Node B supports the eFACH, but the UE does not, then the DRNC transmits the CUC RRC message to the UE through the Node B via the FACH CCCH. In this case, the message is transmitted using a 3GPP Release-99 signaling transport channel.

To ensure that the DRNC provides the CUC RRC message to the UE on the proper forward access channel, the DRNC may provide the CUC RRC message to the UE via both the FACH CCCH and the eFACH CCCH. In this case, the DRNC remains unaware of the forward access channel capabilities of the UE. However, this methodology utilizes unnecessary radio resources.

Alternatively, the DRNC may associate the forward access channel capabilities of the UE with the existing call context controlled by the SRNC. Then, the DRNC retrieves the stored forward access channel capabilities for the UE as necessary, and sends the CUC RRC message to the UE on the FACH or eFACH accordingly. However, this methodology results in unnecessary complexity and performance impacts on the DRNC, which is forced to store UE information that it typically is not required to store and manage. Moreover, when the UE moves to a different cell associated with a different DRNC, the new DRNC is unable to retrieve the existing call context, in which case the DRNC is forced to create a new call context, resulting in two contexts: one in the old DRNC and one in the new DRNC. As a result, the SRNC must manage duplicate DRNC call contexts for the UE.

SUMMARY

Example embodiments are directed to methods and apparatuses for establishing a radio resource control connection between a serving radio network controller (SRNC) and user equipment (UE) through a drift RNC.

At least one example embodiment provides a method for establishing a radio resource control connection between a user equipment and a serving radio network controller through a drift radio network controller. According to at least this example embodiment, the method includes: receiving, at the drift network controller, an indication of a forward access channel capability of the user equipment from the serving radio network controller; and transmitting, by the drift radio network controller, a signaling message to the user equipment according to the forward access channel capability of the user equipment.

According to at least some example embodiments, the indication of the forward access channel capability may be included in a downlink signaling transfer request message from the serving radio network controller. The downlink signaling transfer request message may be Radio Network Subsystem Application Part (RNSAP) message. The signaling message conveyed by the RNSAP message may be a cell update confirm message.

The indication of the forward access channel capability may include an indication of whether the user equipment supports an enhanced forward access channel.

If the user equipment supports the enhanced forward access channel, then the transmitting step may include: transmitting the signaling message to the user equipment via the enhanced forward access channel, but not a non-enhanced forward access channel.

If the user equipment does not support the enhanced forward access channel, then the transmitting step may include: transmitting the signaling message to the user equipment via a non-enhanced forward access channel, but not the enhanced forward access channel.

The signaling message may be transmitted to the user equipment via a common control radio channel.

According to at least some example embodiments, the method may further include: receiving, at the drift radio network controller, a cell update message from the user equipment prior to receiving the indication of the forward access channel capability of the user equipment from the serving radio network controller.

According to at least some example embodiments, the method may further include: determining whether the user equipment supports an enhanced forward access channel based on the indication of the forward access channel capability of the user equipment from the serving radio network controller; and wherein the signaling message is transmitted to the user equipment on only one of a non-enhanced forward access channel and the enhanced forward access channel based on the determining step.

The determining step may include: determining whether the user equipment supports the enhanced forward access channel based on the indication, but independent of forward access capability information received from the user equipment.

At least one other example embodiment provides a method for establishing a radio resource control connection with a user equipment through a drift radio network controller. According to at least this example embodiment, the method includes: establishing a radio link for the drift radio network controller; transmitting, to the drift network controller, an indication of a forward access channel capability of the user equipment; and establishing the radio resource control connection with the user equipment through the drift radio network controller.

At least one other example embodiment provides a radio network controller configured to: receive an indication of a forward access channel capability of a user equipment from a serving radio network controller; and transmit a signaling message to the user equipment according to the forward access channel capability of the user equipment.

The indication of the forward access channel capability may be included in a downlink signaling transfer request message from the serving radio network controller. The downlink signaling transfer request message may be a Radio Network Subsystem Application Part (RNSAP) message.

The indication of the forward access channel capability may include an indication of whether the user equipment supports an enhanced forward access channel.

If the user equipment supports the enhanced forward access channel, then the radio network controller may be further configured to transmit the signaling message to the user equipment via the enhanced forward access channel, but not via the non-enhanced forward access channel, to establish the radio resource control connection between the serving radio network controller and the user equipment through the drift radio network controller.

If the user equipment does not support the enhanced forward access channel, then the radio network controller may be further configured to transmit the signaling message to the user equipment via a non-enhanced forward access channel, but not the enhanced forward access channel.

The radio network controller may be further configured to: determine whether the user equipment supports an enhanced forward access channel based on the indication of the forward access channel capability of the user equipment from the serving radio network controller; and transmit the signaling message to the user equipment on only one of a non-enhanced forward access channel and an enhanced forward access channel based on the determination.

The radio network controller may be further configured to determine whether the user equipment supports an enhanced forward access channel based on the indication, but independent of forward access capability information received from the user equipment.

BRIEF DESCRIPTION OF THE DRAWINGS

The present invention will become more fully understood from the detailed description given herein below and the accompanying drawings, wherein like elements are represented by like reference numerals, which are given by way of illustration only and thus are not limiting of the present invention.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. The use of similar or identical reference numbers in the various drawings is intended to indicate the presence of a similar or identical element or feature.

DETAILED DESCRIPTION OF THE EMBODIMENTS

Various example embodiments will now be described more fully with reference to the accompanying drawings in which some example embodiments are shown.

Detailed illustrative embodiments are disclosed herein. However, specific structural and functional details disclosed herein are merely representative for purposes of describing example embodiments. This invention may, however, be embodied in many alternate forms and should not be construed as limited to only the embodiments set forth herein.

Accordingly, while example embodiments are capable of various modifications and alternative forms, the embodiments are shown by way of example in the drawings and will be described herein in detail. It should be understood, however, that there is no intent to limit example embodiments to the particular forms disclosed. On the contrary, example embodiments are to cover all modifications, equivalents, and alternatives falling within the scope of this disclosure. Like numbers refer to like elements throughout the description of the figures.

Although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of this disclosure. As used herein, the term "and/or," includes any and all combinations of one or more of the associated listed items.

When an element is referred to as being "connected," or "coupled," to another element, it can be directly connected or coupled to the other element or intervening elements may be present. By contrast, when an element is referred to as being "directly connected," or "directly coupled," to another element, there are no intervening elements present. Other words used to describe the relationship between elements should be interpreted in a like fashion (e.g., "between," versus "directly between," "adjacent," versus "directly adjacent," etc.).

The terminology used herein is for the purpose of describing particular embodiments only and is not intended to be limiting. As used herein, the singular forms "a," "an," and "the," are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

It should also be noted that in some alternative implementations, the functions/acts noted may occur out of the order noted in the figures. For example, two figures shown in succession may in fact be executed substantially concurrently or may sometimes be executed in the reverse order, depending upon the functionality/acts involved.

Specific details are provided in the following description to provide a thorough understanding of example embodiments. However, it will be understood by one of ordinary skill in the art that example embodiments may be practiced without these specific details. For example, systems may be shown in block diagrams so as not to obscure the example embodiments in unnecessary detail. In other instances, well-known processes, structures and techniques may be shown without unnecessary detail in order to avoid obscuring example embodiments.

In the following description, illustrative embodiments will be described with reference to acts and symbolic representations of operations (e.g., in the form of flow charts, flow diagrams, data flow diagrams, structure diagrams, block diagrams, etc.) that may be implemented as program modules or functional processes include routines, programs, objects, components, data structures, etc., that perform particular tasks or implement particular abstract data types and may be implemented using existing hardware at existing network elements (e.g., radio network controllers base stations, base station controllers, Node Bs, eNode Bs, user equipments (UEs), etc.). Such existing hardware may include one or more Central Processing Units (CPUs), digital signal processors (DSPs), application-specific-integrated-circuits, field programmable gate arrays (FPGAs) computers or the like.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

As disclosed herein, the term "storage medium" or "computer readable storage medium" may represent one or more devices for storing data, including read only memory (ROM), random access memory (RAM), magnetic RAM, core memory, magnetic disk storage mediums, optical storage mediums, flash memory devices and/or other tangible machine readable mediums for storing information. The term "computer-readable medium" may include, but is not limited to, portable or fixed storage devices, optical storage devices, and various other mediums capable of storing, containing or carrying instruction(s) and/or data.

Furthermore, example embodiments may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a computer readable storage medium. When implemented in software, a processor or processors will perform the necessary tasks.

A code segment may represent a procedure, function, subprogram, program, routine, subroutine, module, software package, class, or any combination of instructions, data structures or program statements. A code segment may be coupled to another code segment or a hardware circuit by passing and/or receiving information, data, arguments, parameters or memory contents. Information, arguments, parameters, data, etc. may be passed, forwarded, or transmitted via any suitable means including memory sharing, message passing, token passing, network transmission, etc.

As used herein, the term "Node B" may be considered synonymous to, and may hereafter be occasionally referred to, as an evolved Node B, eNode B, base station, base transceiver station (BTS), etc., and describes a transceiver in communication with and providing wireless resources to mobiles in a wireless communication network spanning multiple technology generations. As discussed herein, base stations may have all functionally associated with conventional, well-known base stations in addition to the capability and functionality to perform the methods discussed herein. Moreover, as discussed herein, the term cell refers to the coverage area provided by a given Node B. In addition, a given RNC may be referred to as controlling the cell as well as the Node B within a given cell.

The term "user equipment," as discussed herein, may be considered synonymous to, and may hereafter be occasionally referred to, as a client, mobile unit, mobile station, mobile user, mobile, subscriber, user, remote station, access terminal, receiver, etc., and describes a remote user of wireless resources in a wireless communication network.

As mentioned above, a radio network controller (RNC) controls a given portion of a universal terrestrial radio access network (UTRAN). For example, the RNC manages UTRAN resources such as the downlink (DL) or forward link power transmitted by the Node Bs; the uplink (UL) or reverse link interference perceived by the Node Bs; and the hardware situated at the Node Bs. As discussed herein, RNCs may have all functionally associated with conventional, well-known RNCs in addition to the capability and functionality to perform the methods discussed herein.

Example embodiments provide methods and apparatuses for establishing and/or re-establishing a radio resource control (RRC) connection between a UE and a serving RNC (SRNC) via a drift RNC (DRNC). In one example, the RRC connection may be established after radio failure condition associated with the SRNC, for example, when a UE moves from a first cell controlled by a first DRNC to a second cell controlled by a second DRNC. As discussed herein, this first DRNC may be referred to as the old DRNC, whereas the second DRNC may be referred to as the new DRNC.

In accordance with at least one example embodiment, the new DRNC receives an indication of a forward access channel capability of the UE from the SRNC, and then the RRC connection between the SRNC and the UE is established through the new DRNC based on the forward access channel capability of the UE.

In accordance with at least one other example embodiment, the SRNC establishes a radio link between itself and the new DRNC, and then transmits an indication of a forward access channel capability of the UE to the new DRNC. The RRC connection between the SRNC and the UE is then established through the DRNC.

One or more example embodiments may also provide a method in which the RRC connection between the UE and the SRNC is transferred from one DRNC to another.

According to at least one other example embodiment, the DRNC receives an indication of a forward access channel capability of the UE from the SRNC, and transmits a signaling message to the UE according to the forward access channel capability of the user equipment.

According to at least one other example embodiment, a radio link for the DRNC is established and the SRNC transmits an indication of a forward access channel capability of the user equipment the DRNC. The RRC connection with the UE is then established through the DRNC.

Figure 1:
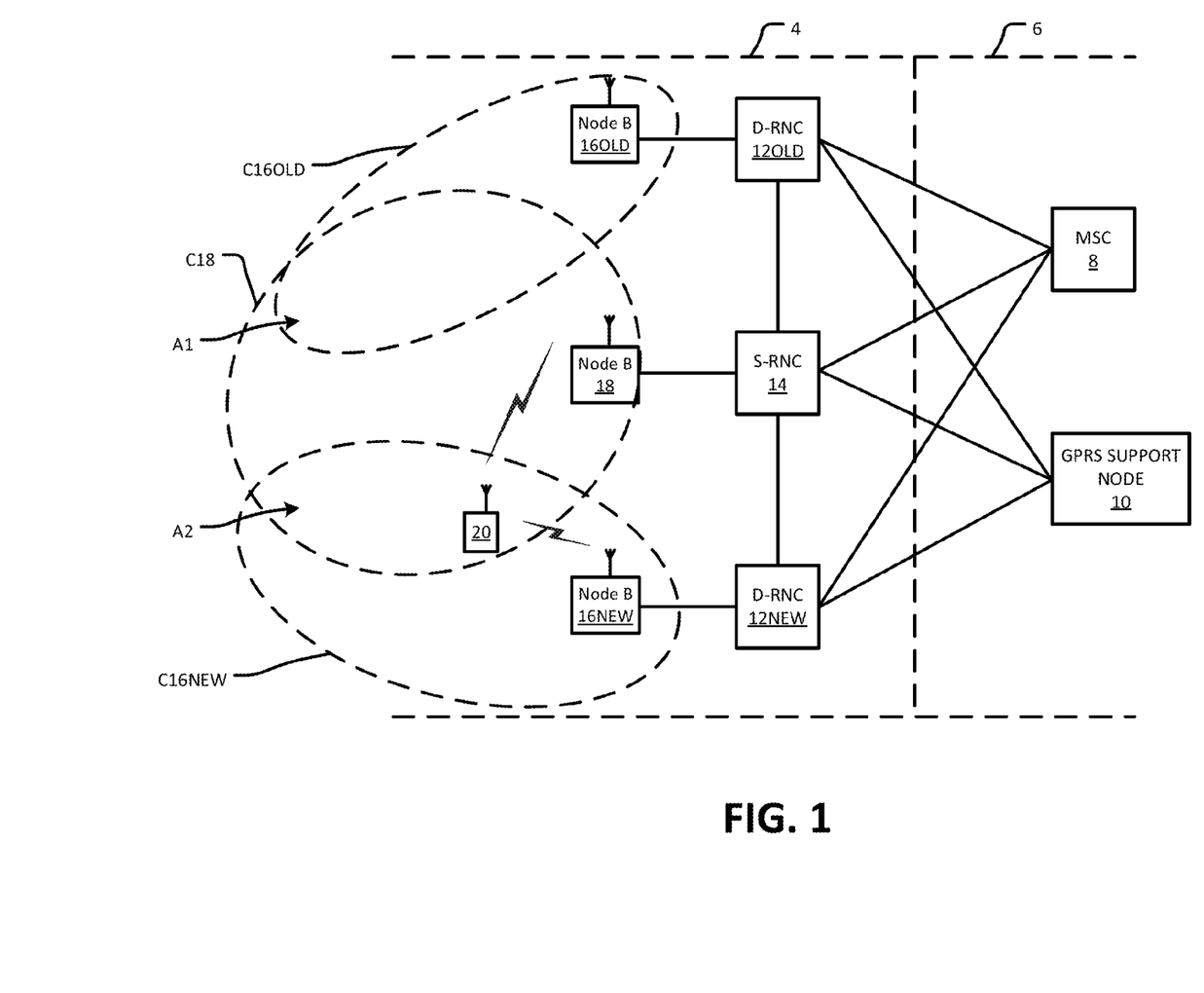
FIG. 1 illustrates a portion of a wireless network.

FIG. 1 illustrates an example wireless network in which example embodiments may be implemented. As shown, the wireless network includes a UTRAN 4 and a core network (CN) 6.

Referring to FIG. 1, each Node B 16OLD, 16NEW and 18 provides radio access to UEs, such as UE 20, within a respective cell C16OLD, C16NEW and C18. Node B 16OLD is connected to and controlled by DRNC 12OLD. Node B 16NEW is connected to and controlled by DRNC 12NEW. Node B 18 is connected to and controlled by SRNC 14. The Node Bs communicate with the RNC over the "Iub" interface.

Each of the DRNCs 12OLD and 12NEW are also communicatively coupled to the SRNC 14 via the "Iur" interface.

Each of the DRNC 12OLD, DRNC 12NEW and SRNC 14 is also connected to a mobile switching center (MSC) 8 and/or servicing GPRS (general packet radio system) support node (SGSN) 10 within the CN 6 via the "Iu" interface. Because the MSC 8 and the SGSN 10 are well-known, a detailed discussion of these components of the CN 6 is omitted.

Figure 4:
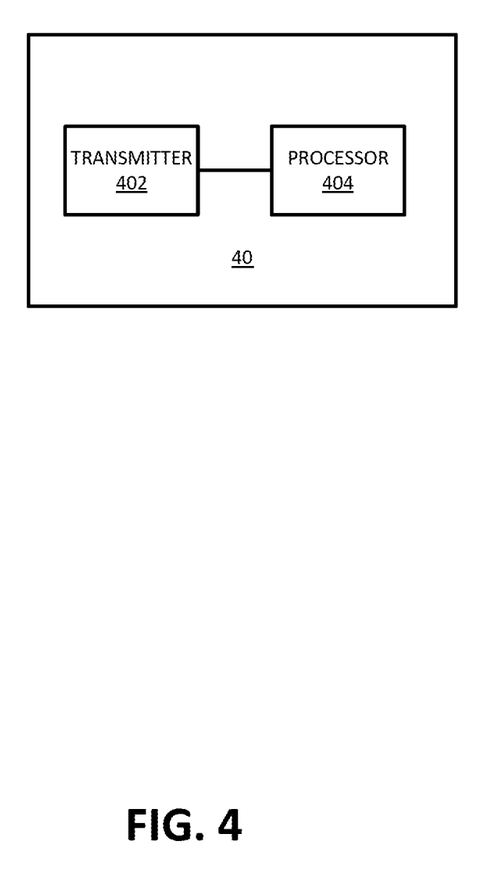
FIG. 4 is a simplified block diagram of an example radio network controller.

FIG. 4 is a simplified block diagram of a RNC. The RNC 40 shown in FIG. 4 may be function as one or more of the SRNC 14 and the DRNCs 12OLD and 12NEW.

Referring to FIG. 4, the RNC 40 includes a transmitter 402 to communicate (transmit and receive messages wirelessly and/or via wired links) with other elements of the UTRAN 4 and the CN 6, including but not limited to those shown in FIG. 1. The RNC 40 further includes a processor 404. The processor 404 may be configured to perform conventional functions associated with an RNC, as well as the functions discussed herein, including those mentioned above and below.

Returning to FIG. 1, the UE 20 regularly moves from one cell to another. Since adjacent cells overlap, the UE 20 is at times located simultaneously in two cells. If, for example, the UE 20 moves from cell C18 associated with serving Node B 18 to area A1 in which cell C18 overlaps with cell C16OLD associated with Node B 16OLD, the SRNC 14 continues to control the UE 20 during soft-handoff until the SRNC 14 passes control of the UE 20 to the DRNC 12OLD.

During this soft-handoff period, the SRNC 14 receives and transmits signals from and to the UE 20 directly through Node B 18 or through the DRNC 12OLD and Node B 16OLD.

If the UE 20 moves from area A1 to area A2 in which cells C16NEW and C18 overlap before control is passed to the DRNC 12OLD, a radio failure condition may occur with respect to the RRC connection between the UE 20 and the SRNC 14 through DRNC 12OLD. In this instance, to recover from this failure, a RRC connection between the UE 20 and the SRNC 14 is established through the new DRNC 12NEW and its corresponding Node B 16NEW.

Figure 2:
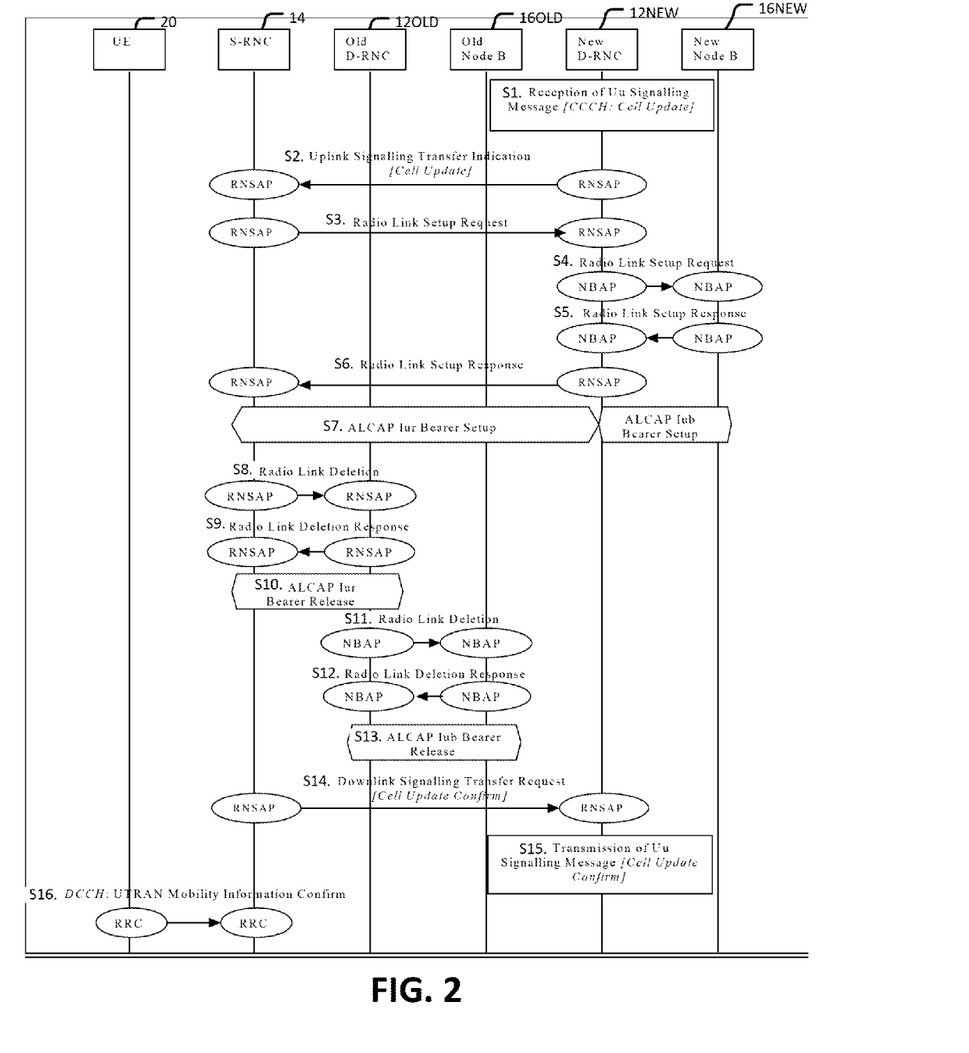
FIG. 2 is a signal flow diagram illustrating a method for establishing a radio resource control connection through a drift radio network controller according to an example embodiment.

FIG. 2 is a signal flow diagram illustrating an example embodiment of a method for establishing (or re-establishing) a RRC connection between the SRNC 14 and the UE 20 through the DRNC 12NEW in response to a radio failure condition such as that discussed above. For ease of explanation, a method steps S1 through S15 are embedded in the signal flow diagram shown in FIG. 2.

Methods for establishing (or re-establishing) a RRC connection between the SRNC 14 and the UE 20 shown in FIG. 2 will be described with regard to a radio failure condition such as that discussed above. However, example embodiments may be applicable to any situation in which a radio failure condition occurs with respect to an RRC connection between a UE and an SRNC. Moreover, although the example embodiment shown in FIG. 2 will be described with regard to establishing the RRC connection between the UE 20 and the SRNC 14 through the DRNC 12NEW, the RRC connection may also be re-established through the same DRNC (e.g., DRNC 12OLD) involved with the radio failure condition.

Referring to FIG. 2, at step S1 the UE 20 initiates establishment of the RRC connection by sending a Cell Update (CU) message to the DRNC 12NEW via the Node B 16NEW on the common control radio channel (CCCH).

At step S2, the DRNC 12NEW delivers the Cell Update message transparently to the SRNC 14 by sending a Radio Network Subsystem Application Part (RNSAP) message ("Uplink Signaling Transfer Indication") message to the SRNC 14.

RNSAP is a well-known 3GPP signaling protocol responsible for communications between RNCs. RNSAP messages are transmitted via the well-known Iur interface between RNCs, and provide functionality needed for soft handovers and handoff between RNCs. RNSAP is defined by the 3GPP specification TS 25.423. Because RNSAP is well-known, a detailed discussion is omitted.

Still referring to FIG. 2, at steps S3 through S7 in FIG. 2, the radio link and the Iur/Iub data transport bearer through the DRNC 12NEW are setup.

In more detail, at step S3, the SRNC 14 allocates radio resources for the RRC connection through the DRNC 12NEW on the Iur interface, and sends a RNSAP message ("Radio Link Setup Request") to the DRNC 12NEW.

In response to the RNSAP message ("Radio Link Setup Request") from the SRNC 14, at step S4 the DRNC 12NEW sends a Node B Application Part (NBAP) message ("Radio Link Setup Request") to the Node B 16NEW.

In response to the NBAP message ("Radio Link Setup Request") from the DRNC 12NEW, the Node B 16NEW allocates radio resources for the RRC connection, and sends a NBAP message ("Radio Link Setup Response") back to the DRNC 12NEW at step S5.

As is well-known, in a UTRAN the NBAP is the signaling protocol responsible used by an RNC to control a Node B. The NBAP forms part of the Iub interface between the RNC and the Node B. Because the NBAP is well-known, a more detailed discussion is omitted.

In response to the "Radio Link Setup Response" message from the Node B 16NEW at step S5, the DRNC 12NEW sends a RNSAP message ("Radio Link Setup Response") to the SRNC 14 at step S6.

In response to the "Radio Link Setup Response" message from the DRNC 12NEW at step S6, the SRNC 14 initiates (or requests) setup of the Iur/Iub data transport bearer using the Access Link Control Application Part (ALCAP) protocol at step S7. The request for setup of the Iur/Iub data transport bearer from the SRNC 14 is acknowledged by DRNC 12NEW as well as the Node B 16NEW.

As is well-known, in a UTRAN, the ALCAP protocol is the protocol used for control plane of transport layer in charge of managing and multiplexing users into Asynchronous Transfer Mode (ATM) Adaptation Layer type 2 (AAL2) virtual connections. The ALCAP is specified for the Iub, Iur and Iu interfaces of the UTRAN. For Iub and Iur interfaces, the ALCAP is specified in 3GPP TS 25.426. For the Iu interface, ALCAP is specified in 3GPP TS 25.414. Because the ALCAP is well-known, a more detailed discussion is omitted.

Still referring to FIG. 2, the radio link between the SRNC 14 and the DRNC 12OLD and the Iur/Iub data transport bearer for the DRNC 12OLD are then released at steps S8 through S13.

In more detail, at step S8 the SRNC 14 sends an RNSAP message ("Radio Link Deletion Request") to the DRNC 12OLD.

In response to the RNSAP message ("Radio Link Deletion Request"), the DRNC 12OLD sends an RNSAP message ("Radio Link Deletion Response") to the SRNC 14 at step S9.

In response to the RNSAP message ("Radio Link Deletion Response"), the SRNC 14 releases the Iur Data Transport bearer using the ALCAP protocol at step S10.

At step S11, the DRNC 12OLD sends the NBAP message ("Radio Link Deletion Request") to the Node B 16OLD.

At step S12, the Node B 16OLD sends a NBAP message ("Radio Link Deletion Response") to the DRNC 12OLD in response to the NBAP message ("Radio Link Deletion Request") from the DRNC 12OLD.

The DRNC 12OLD releases the Iub Data Transport bearer using the ALCAP protocol at step S13 in response to the NBAP message ("Radio Link Deletion Response") from the Node B 16OLD.

At steps S14 through S16, the RRC connection between the UE 20 and the SRNC 14 through the DRNC 12NEW is established.

In more detail, at step S14 the SRNC 14 sends a RNSAP message ("Downlink Signaling Transfer Request") to convey (e.g., including) a Cell Update Confirm (CUC) message to the DRNC 12NEW. The "Downlink Signaling Transfer Request" message may also be referred to as a Radio Network Subsystem message, a RRC connection establishment message, or a signaling request message.

Figure 3:
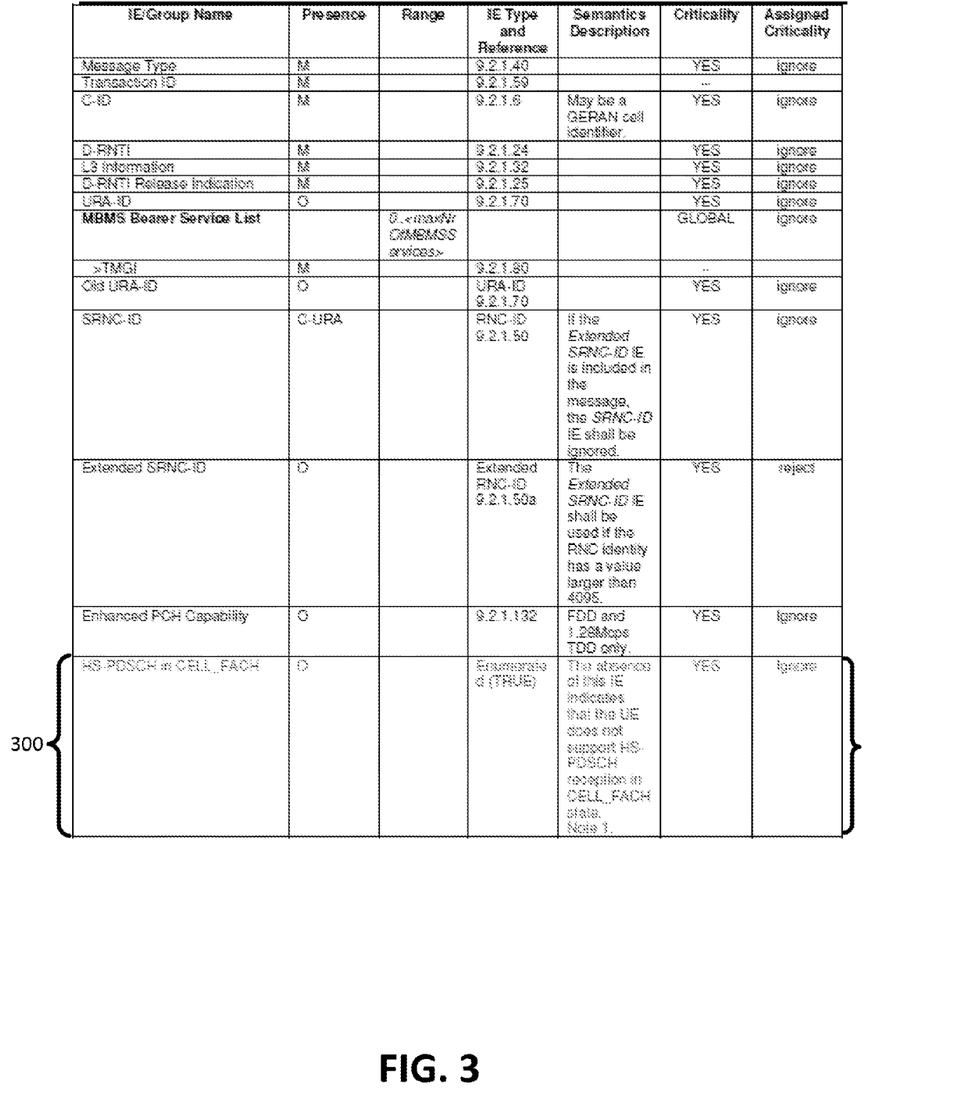
FIG. 3 illustrates a structure of a downlink signaling transfer request message according to an example embodiment.

FIG. 3 illustrates an example structure of a "Downlink Signaling Transfer Request" message sent to the DRNC 12NEW at step S14 in FIG. 2.

Referring to FIG. 3, the "Downlink Signaling Transfer Request" message includes a forward access channel capability field 300 indicative of the forward access channel capability of the UE 20. In one example, the forward access channel capability field 300 may include a flag or indicator bit indicating whether the UE 20 supports the eFACH; that is, whether the UE 20 is capable of receiving eFACH transmissions from Node Bs. In the example illustrated in FIG. 3, the forward access channel capability field 300 is designated "HS-PDSCH in CELL_FACH". If the UE 20 supports eFACH transmissions, then the flag bit is set (e.g., to '1'), whereas if the UE 20 does not support eFACH transmissions, then the flag bit is not set (e.g., has a value of '0'). By reading or examining the state of the forward access channel capability field 300 in the "Downlink Signaling Transfer Request" message from the SRNC 14 at step S14, the DRNC 12NEW determines the forward access channel capabilities of the UE 20 independent of forward access capability information received from the user equipment.

Still referring to FIG. 3, the "Downlink Signaling Transfer Request" message may further include information elements such as: an indication of message type, a transaction ID, a cell identifier (C-ID), a drift radio network temporary identifier (D-RNTI), L3 information, a D-RNTI release indication, and a temporary mobile group identity. In at least some cases, these information elements may be a mandatory part of the "Downlink Signaling Transfer Request" message.

Additionally, the "Downlink Signaling Transfer Request" message may optionally include information elements such as: a UTRAN registration area identification (URA-ID), an Old URA-ID, an extended SRNC identification (SRNC-ID), and an enhanced paging capability indication (Enhanced PCH Capability).

Returning to FIG. 2, at step S15 the DRNC 12NEW sends a signaling message (e.g., the Cell Update Confirm (CUC) message) to the UE 20 via the FACH or eFACH according to the forward access channel capabilities of the UE 20. For example, the DRNC 12NEW delivers the CUC message to the Node B 16NEW, which then transmits the signaling message to communicate the CUC to the UE 20 on the FACH or eFACH according to the forward access channel capabilities of the UE 20.

For example, if the UE 20 supports the eFACH, then the DRNC 12NEW sends the signaling message to the UE 20 through the Node B 16NEW via the eFACH. In this case, the message is transmitted via the High-Speed Data Signaling Control Channel (HS-DSCH).

If the UE 20 does not support the eFACH, then the DRNC 12NEW transmits the signaling message to the UE 20 through the Node B 16NEW via the FACH. In this case, the message is transmitted using a 3GPP Release-99 signaling transport channel.

Still referring to FIG. 2, at step S16 the UE 20 sends a RRC message ("UTRAN Mobility Information Confirm") message to the SRNC 14 via the newly established dedicated control channel (DCCH) through the DRNC 12NEW to establish the RRC connection with the SRNC 14 through the DRNC 12NEW.

Example embodiments discussed herein may reduce unnecessary complexity and performance impacts on the DRNC. Example embodiments may also reduce utilization of unnecessary radio resources when providing Cell Update Confirm messages from the DRNC to the UE in the event of a radio failure condition, such as that discussed herein.

The foregoing description of example embodiments has been provided for purposes of illustration and description. It is not intended to be exhaustive or to limit the disclosure. Individual elements or features of a particular example embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

I claim:

1. A method for establishing a radio resource control connection between a user equipment and a serving radio network controller through a drift radio network controller, the method comprising:

receiving, at the drift radio network controller after a failure condition at the serving radio network controller, an indication of a forward access channel capability of the user equipment from the serving radio network controller;

determining, independent of forward access capability information received from the user equipment, whether the user equipment supports an enhanced forward access channel based on the indication of the forward access channel capability of the user equipment from the serving radio network controller;

re-establishing, by the drift radio network controller, the radio resource control connection between the user equipment and the serving radio network controller through the drift radio network controller by transmitting a Cell Update Confirm message to the user equipment via only the enhanced forward access channel if the determining step determines that the user equipment supports the enhanced forward access channel, and transmitting the Cell Update Confirm message to the user equipment via only a non-enhanced forward access channel if the determining step determines that the user equipment does not support the enhanced forward access channel;

wherein the indication of the forward access channel capability is included in a Radio Network Subsystem Application Part (RNSAP) message from the serving radio network controller; and wherein the Cell Update Confirm message is transmitted to the user equipment via a common control radio channel.

2. The method of claim 1, further comprising:

receiving, at the drift radio network controller, a Cell Update Confirm message from the user equipment prior to receiving the indication of the forward access channel capability of the user equipment from the serving radio network controller.

3. A drift radio network controller configured to, receive an indication of a forward access channel capability of a user equipment from a serving radio network controller after a failure condition at the serving radio network controller;

determine, independent of forward access capability information received from the user equipment, whether the user equipment supports an enhanced forward access channel based on the indication of the forward access channel capability of the user equipment from the serving radio network controller;

re-establish a radio resource control connection between the user equipment and the serving radio network controller through the drift radio network controller by transmitting a Cell Update Confirm message to the user equipment via only the enhanced forward access channel if the user equipment supports the enhanced forward access channel, and transmitting the Cell Update Confirm message to the user equipment via only a non-enhanced forward access channel if the user equipment does not support the enhanced forward access channel;

wherein the indication of the forward access channel capability is included in a Radio Network Subsystem Application Part (RNSAP) message from the serving radio network controller; and wherein the Cell Update Confirm message is transmitted to the user equipment via a common control radio channel.

4. The drift radio network controller of claim 3, wherein the drift radio network controller is further configured to receive a Cell Update Confirm message from the user equipment prior to receiving the indication of the forward access channel capability of the user equipment from the serving radio network controller.

\* \* \* \* \*